United States Patent [19]
Gesing et al.

[11] Patent Number: 5,254,509
[45] Date of Patent: * Oct. 19, 1993

[54] PRODUCTION OF METAL CARBIDE ARTICLES

[75] Inventors: Adam J. Gesing; Edward S. Luce; Narashima S. Raghavan, all of Kingston, Canada; Danny R. White, New Castle, Del.

[73] Assignee: Lanxide Technology Company, LP, Newark, Del.

[*] Notice: The portion of the term of this patent subsequent to Jan. 20, 2007 has been disclaimed.

[21] Appl. No.: 823,530

[22] Filed: Jan. 21, 1992

Related U.S. Application Data

[60] Continuation of Ser. No. 414,191, Sep. 28, 1989, Pat. No. 5,082,807, which is a division of Ser. No. 2,823, Jan. 2, 1990, Pat. No. 4,891,338.

[51] Int. Cl.$^5$ .............................. C04B 35/56
[52] U.S. Cl. ........................ 501/93; 501/102
[58] Field of Search ..................... 501/93, 102

[56] References Cited

U.S. PATENT DOCUMENTS

| | | | |
|---|---|---|---|
| Re. 31,526 | 2/1954 | Smith et al. | 419/5 |
| 915,657 | 3/1907 | Bulton | 419/17 |
| 3,340,076 | 9/1967 | Alper et al. | 106/56 |
| 3,472,709 | 10/1969 | Quatinetz et al. | 419/14 |
| 3,488,291 | 1/1970 | Hardy et al. | 419/17 |
| 3,725,015 | 4/1973 | Weaver | 419/17 |
| 3,737,289 | 6/1973 | Rudy | 29/182.7 |
| 3,758,662 | 9/1973 | Tobin et al. | 264/332 |
| 3,778,261 | 12/1973 | Nicholas et al. | 419/17 |
| 3,864,154 | 2/1975 | Gazza et al. | 29/123 B |
| 3,915,699 | 10/1975 | Umehara et al. | 419/17 |
| 4,289,833 | 9/1981 | Hachisuka | 419/17 |
| 4,347,083 | 8/1982 | Sara | 419/11 |
| 4,471,059 | 9/1984 | Yoshino et al. | 501/96 |
| 4,490,319 | 12/1984 | Lee et al. | 264/65 |
| 4,585,618 | 4/1986 | Fresnel et al. | 419/12 |
| 4,595,545 | 1/1986 | Sane | 264/65 |
| 4,605,440 | 8/1986 | Halverson et al. | 75/238 |
| 4,687,077 | 8/1987 | Chevigne et al. | 419/17 |
| 4,692,418 | 9/1987 | Boecker et al. | 501/90 |
| 4,702,770 | 10/1987 | Pyzik et al. | 75/236 |
| 4,713,360 | 12/1987 | Newkirk et al. | 501/87 |
| 4,718,941 | 1/1988 | Halverson et al. | 75/236 |
| 4,806,508 | 2/1989 | Dwivedi et al. | 501/94 |
| 4,834,938 | 5/1989 | Pyzik et al. | 419/6 |
| 4,891,338 | 1/1990 | Gesing et al. | 501/87 |
| 5,082,807 | 1/1992 | Gesing et al. | 501/93 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1977 | United Kingdom . |
| 1596303 | 8/1981 | United Kingdom . |

OTHER PUBLICATIONS

"Oxidation of Molten Aluminum Alloys. Reaction with Refractories" M. Drouzy and M. Richard-Mar., 1974-Fonderie, France No. 332 pp. 121-128.

"Refractories for Aluminum Alloy Melting Furnaces'-'-B. Clavaud and V. Jost-Sep., 1980-Lillian Brassinga (from French) Jan., 1985.

*Primary Examiner*—Mark L. Bell
*Assistant Examiner*—Chris Gallo
*Attorney, Agent, or Firm*—Mark G. Mortenson; Jeffrey R. Ramberg

[57] ABSTRACT

A method for manufacture of Group IVB metal carbide comprising a carbide of a metal selected from the group consisting of titanium, hafnium and zirconium ceramic composites is provided wherein a permeable mass of filler and carbon is contacted with a molten Group IVB metal. The molten metal is maintained in contact with the permeable mass for a sufficient period to infiltrate the permeable mass and to react the molten metal with the carbon source to form a Group IVB metal carbide composite. The permeable mass may comprise a Group IVB metal carbide, or other inert filler, or a combination of filler materials.

20 Claims, 1 Drawing Sheet

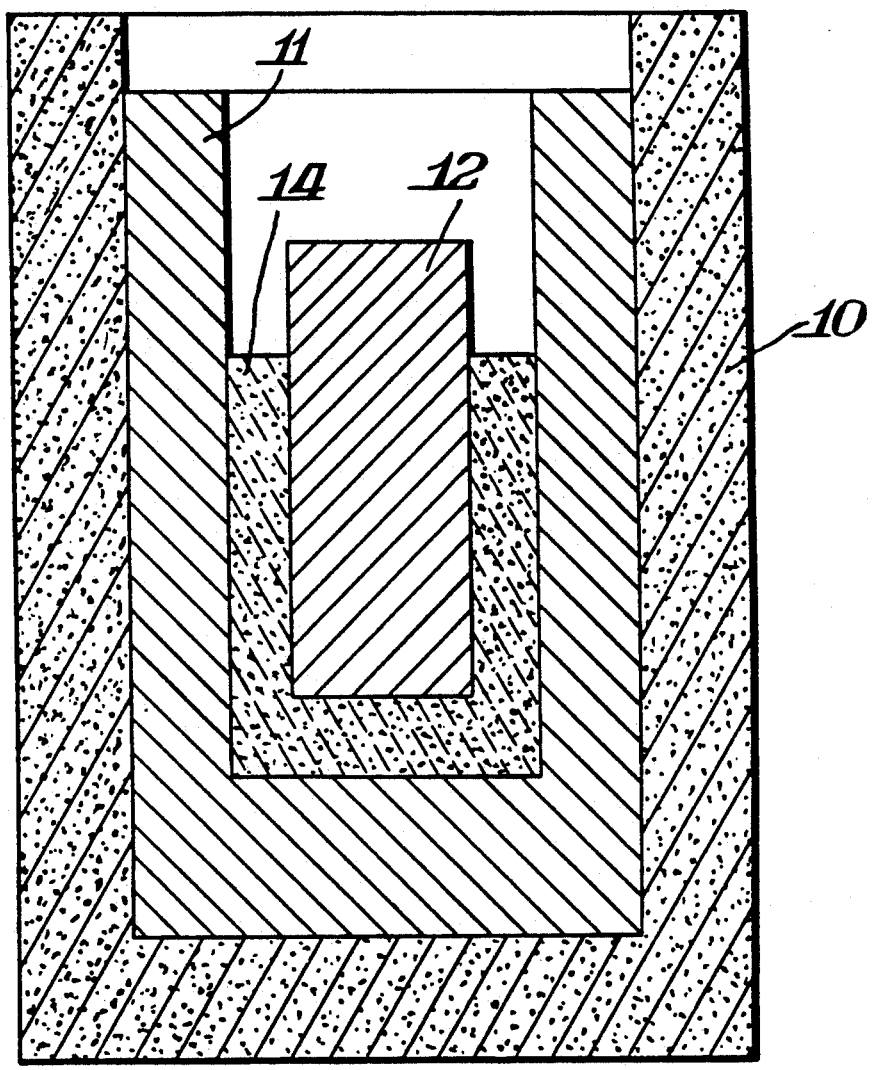

PRODUCTION OF METAL CARBIDE ARTICLES

This is a continuation of copending application Ser. No. 07/414,191 filed on Sep. 28, 1989, now U.S. Pat. No. 5,082,807, which is a divisional application of U.S. application Ser. No. 07/002,823, which issued on Jan. 2, 1990, as U.S. Pat. No. 4,891,338.

FIELD OF THE INVENTION

This invention relates to methods of making self-supporting ceramic bodies comprising carbides of the metals titanium, hafnium, or zirconium, and to the products of such methods.

BACKGROUND OF THE INVENTION

There is substantial interest in using ceramics and ceramic composites in a variety of industrial, electrical, and structural applications. Numerous properties characteristic of these materials, such as hardness, refractoriness, thermal and electrical insulation, and resistance to erosion and corrosion, may be advantageously and beneficially utilized depending on the end-use. Also, ceramics and ceramic composites provide attractive alternatives to metals for many existing purposes, as well as enabling the development of new components for which metals or other materials are unsuitable.

There are several limitations, however, in substituting ceramics for metals, and the development and production of ceramic components for technologically advanced applications is attended with problems. Known methods of preparing ceramic components involves powder-based fabrication, most typically at elevated temperatures and pressures, such as by hot-pressing, reaction sintering and reaction hot-pressing. This technology for fabricating ceramics manifests numerous deficiencies. These limitations or deficiencies include, for example, scaling versatility, capability to produce complex shapes, high costs of sinterable powders, lack of batch-to-batch reproducibility of powder properties, and substantial shrinkage on sintering. The present invention overcomes these limitations or deficiencies, and provides a novel method for reliably producing refractory metal carbide composites.

Ceramic carbides are well known in the art, and have been extensively studied in the ceramics industry. Also, components of these materials, made by conventional powder processing techniques, have achieved limited commercial success. A different process has been developed for the manufacture of siliconized silicon carbide, which produces a self-bonded ceramic body. In one such process known as the REFEL process, molten silicon is caused to infiltrate a porous preform of carbon and silicon carbide. The molten silicon reacts with the carbon to form additional silicon carbide that partially fills the interstices of the preform. The resulting ceramic components are relatively dense and brittle, consisting of silicon carbide and silicon. Although this process has become well known and there is extensive patent coverage, there is no suggestion that the REFEL process or other related processes are applicable to other elements or metals. In fact, silicon is the only element of Group IVA of the Periodic Table (C, Si, Ge, Sn, Pb) that forms a ceramic carbide by reaction of the molten element with carbon, and therefore there is no reason to believe that other metals can be used in a similar process. (Any reference to the Periodic Table is from the "Handbook of Chemistry and Physics", 59th Edition, 1978-1979, CRC Press, Inc.

High temperature resistant articles are disclosed in U.S. Pat. No. 3,288,573 to Abos. In accordance with the teachings of this patent, there is disclosed a composite comprised of graphite particles surrounded by an envelope of a carbide-forming material, including titanium, zirconium, hafnium, vanadium, nickel, tantalum, chromium, molybdenum, tungsten and silicon. According to the process of this patent, a preheated porous graphite body is infiltrated by a molten mass of silicon, or other identified metal, which partially reacts with the graphite particles to form carbide envelopes around each particle. Because the resulting product contains free carbon, the product exhibits certain qualities of graphite, most notably thermal shock resistance.

Among materials having potentially superior properties for particular components are the carbides of the Group IVB metals, viz., titanium, zirconium, and hafnium. It is known to produce titanium, zirconium and hafnium carbides by a method known as self-propagating high temperature synthesis, in which a powder mixture of the metal and carbon is ignited by local heating so that the resulting combustion front sweeps through the mixture resulting in the formation of the metal carbide. A major disadvantage of this method, however, is that upon combustion of adsorbed contaminants there is a vigorous evolution of gases which causes a porous and inhomogeneous microstructure. Porosity also may be caused by melting of the reaction product in the intense heat of the reaction, followed by local shrinkage on solidification. In some instances, an improvement in microstructure can be achieved by application of pressure during combustion.

SUMMARY OF THE INVENTION

The present invention broadly provides a new and improved method of making ceramic articles comprising Group IVB metal carbide materials. In this broad sense, the method of the invention comprises the steps of establishing a body of parent metal selected from the group consisting of titanium, zirconium, and hafnium (Group IVA metal) in surface contact with a permeable mass of filler material and a carbon source for reaction with the molten parent metal to form the carbide thereof. The carbon portion or moiety of the carbon source is present in a stoichiometric amount relative to the Group IVB metal so that substantially all carbon is reacted. The filler material comprises at least one Group IVB metal carbide, or another relatively inert filler, or a combination thereof.

The metal carbide filler in particulate form is admixed with the carbon source to form the permeable mass or bed, which desirably is shaped as a preform. In addition, the bed or preform may include one or more substantially inert or nonreactive fillers as a reinforcing agent such as metal oxides, carbides, nitrides, borides, and the like. The filler material, whether as a Group IVB metal carbide and/or other filler material, also serves as a diluent to control the exothermic nature of the carbon-metal reaction. Conveniently, the carbon source may be elemental carbon, present, for example, as graphite particles mixed with the filler to constitute the porous bed or preform. Where desired, the carbon source may be a reducible metal carbide such as molybdenum carbide, and the resulting product comprises parent metal carbide and molybdenum, and optionally unreacted parent metal, as well as a filler.

The parent metal is heated in a substantially inert atmosphere above its melting point to form a body of molten metal. The temperature and surface contact is maintained for a time sufficient to effect progressive infiltration of molten metal into the permeable mass and to permit or cause reaction of the metal with the carbon source to form a parent metal carbide. The infiltration/reaction is continued for a time sufficient to at least substantially complete the carbide-forming reaction. Upon cooling, a self-supporting ceramic composite is produced comprising a filler embedded by titanium carbide, zirconium carbide, or hafnium carbide formed in situ by the infiltration reaction between the molten metal and carbon of the carbon source. In a further embodiment, if an excess of parent metal is used relative to the stoichiometric amount of carbon, the composite will include unreacted parent metal.

In one embodiment, the filler may be a carbide of a metal corresponding to the parent metal. That is, if the parent metal is titanium, the metal carbide as filler may be titanium carbide. In that case, the end product comprises titanium carbide formed as the reaction product and titanium carbide as filler. In a preferred embodiment of the present invention, the Group IVB metal carbide as filler (in addition to the carbon source) is of a Group IVB metal other than the parent metal. If the metal carbide as filler is different from that of the parent metal, there is formed a solid solution of a ternary system between carbon and/or inert filler and the two metals. In a further embodiment, the filler is a relatively inert compound such as a metal oxide, boride, nitride, etc., rather than a carbide. A mixture of fillers, carbide and non-carbide, may also be employed. The choice of filler materials makes it possible to tailor the properties of the resulting composite, as explained below in greater detail.

The ceramic products produced by this invention comprise a composite of Group IVB metal carbide materials which includes (a) the reaction product of molten parent metal with the carbon source and (b) a metal carbide filler and/or inert filler, a ternary carbide solid solution, or both, and (c) optionally free parent metal, and/or reduced metal from the carbon source, depending upon such factors as the amount of parent metal relative to the carbon source, type of filler(s) and type of carbon source.

BRIEF DESCRIPTION OF THE DRAWINGS

FIG. 1 is a schematic, cross-sectional view in elevation showing an assembly of a body of parent metal partially embedded within a bed of permeable filler material and confined within a cylindrical graphite crucible having a titanium carbide inner liner.

DETAILED DESCRIPTION OF THE INVENTION

In the practice of the present invention, a parent metal of Group IVB and a permeable mass comprising carbon and filler material(s) are oriented with respect to each other in surface contact so that molten parent metal will infiltrate the mass. The parent metal, which is selected from the group consisting of titanium, hafnium and zirconium, may be the pure or relatively pure metal, commercially available metal having impurities or alloying constituents, or an alloy in which the designated parent metal is the major constituent. This positioning and orientation of the parent metal and permeable mass with respect to each other may be accomplished in any one of several ways. For example, a body of parent metal may be embedded in the mass as illustrated in FIG. 1, or the body of parent metal may be positioned adjacent to or contiguous with a bed or other assembly of such filler materials.

The permeable mass or bed, which desirably may be shaped as a preform, comprises at least one filler and a carbon source for reaction with the molten parent metal to form the carbide thereof. The carbon source may be elemental carbon or a metal carbide reducible by the molten parent metal and the amount of parent metal as infiltrate is that stoichiometrically required for the substantially complete reaction of the carbon moiety of the carbon source. Substantially all of the carbon moiety of the carbon source is to be reacted because any unreacted carbon would tend to reduce the hardness and possibly other important properties of the material. If elemental carbon is used as the carbon source, the carbon ideally should be relatively pure, because many impurities typically associated with carbon, such as hydrogen or a hydrocarbon, evolve into gases at the processing temperatures, which might cause porosity in the ceramic product. Suitable elemental carbon includes, for example, graphite, carbon black and petroleum coke, and the carbon may be amorphous or crystalline. The carbon may be in any suitable form such as powder, particle, fiber or flake, or the like, and may range in size from plus 325 Tyler mesh to minus 20 Tyler mesh, and more preferably from about plus 100 Tyler mesh to minus 48 Tyler mesh.

Under the process conditions of this invention, the reaction tends to be exothermic, and certain grades, types or sizes of carbon can be too reactive, thereby resulting in cracks or flaws in the ceramic product. For that reason, amorphous carbon or carbon powder that is too fine may be too reactive and therefore not suitable as a carbon source unless the reaction is moderated, as by the use of a suitable filler. The more crystalline carbon tends to be less reactive, and graphite, especially large flakes, is not as reactive as carbon black. It is generally more suitable to use highly reactive grades of carbon in larger sizes in order to moderate the reaction. Also, a filler incorporated into the bed or preform moderates the reaction, as well as serving as filler for the finished product, which is explained below in greater detail.

Where desired, the carbon source may be one or more metal carbides reducible by the molten parent metal. The metal carbide may be used in combination with elemental carbon, but the total carbon source present is not more than the stoichiometric amount required for the substantially complete reaction of the carbon source. Suitable metal carbides include, for example, molybdenum carbide, chromium carbide, cobalt carbide, iron carbide, nickel carbide, and vanadium carbide. It is recognized that a Group IVB metal carbide that is different from the parent metal may be reducible by the parent metal, but the reaction is too slow to be very useful. When a reducible metal carbide is used, the molten parent metal reacts to form a new carbide and reduced metal. For example, if iron carbide or molybdenum carbide are used as filler in conjunction with titanium parent metal, the resulting composite will contain titanium carbide and iron or molybdenum. In this manner, a second metal constituent, e.g., iron or molybdenum is introduced into the finished product, which provides flexibility in tailoring the composite microstructure and properties. In such a case, molybdenum has a higher melting point and is more ductile than titanium, and therefore it may be desirable to produce a titanium carbide ceramic containing molybdenum metal in the microstructure in order to obtain a product possessing one or more properties attributable to the presence of molybdenum. As a further advantage, relative to direct reaction with carbon by the parent metal, a reducible metal carbide moderates the reaction process which tends to be exothermic, and therefore a reducible metal carbide used alternatively or in combination with elemental carbon may be particularly advantageous in that the relatively high reactivity of the carbon is moderated by the metal carbide.

In one embodiment of the invention, a metal carbide utilized as filler may be of a metal corresponding to the parent metal or, more preferably, of a different metal. In either case, the metal carbide filler serves as a filler in the final product. For example, in a lay-up of titanium parent metal and titanium carbide as filler for the bed or preform (also comprising the carbon source), the end product will contain both carbides, viz., the metal carbide initially present in the bed or preform and the metal carbide formed by reaction between the parent metal and carbon source. The metal carbide as filler helps to moderate the reaction due to its non-reactivity and absorption of sensible heat, which may be particularly beneficial when employing a more highly reactive carbon, e.g., amorphous carbon black. In addition, the Group IVB metal carbides form an extensive range of ternary solid solutions between themselves, e.g. $(Zr_xTi_{1-x})C$, $(Hf_xTi_{1-x})C$ and $(Zr_xHf_{1-x})C$. Therefore, in accordance with one embodiment of the invention, when a Group IVB metal infiltrates a bed or preform containing a Group IVB metal carbide different from the parent metal, such solid solutions are readily formed. Still further, metal carbides in addition to the Group IVB metal carbides may be used as a filler and diluent in moderating the reaction as long as the other metal carbides are stable when in contact with the carbon source and the molten parent metal. Such metal carbides include, for example, silicon carbide, tantalum carbide, and tungsten carbide. It thus will be observed that the choice of Group IVB metal carbides, either alone or in combination with other filler materials, also provides an advantageous method of tailoring the chemistry and microstructure, and hence the properties, of the product. In particular, thermal conductivity is substantially suppressed, electrical resistivity increased, and hardness enhanced by formation of the solid solutions. The relative proportion of the two or more components in the solid solution can be controlled by either alloying of the metal body, or by providing a mixture of powdered carbides in the porous preform or bed. Where desired, both carbides can be of the same metal, or more than one metal carbide can be used as filler, or a mixture of filler materials can be used, which can be predetermined based on the properties required for the end product.

The filler material used in conjunction with the carbon source should have a sufficiently high melting point to maintain stability under the process conditions. Typically, the melting point of the filler is chosen so as to be higher than the melting point of the parent metal and the process temperature. The process temperature can be lowered somewhat by utilizing an alloy of the parent metal, which possesses a lower melting point than the pure parent metal, and then a filler with a correspondingly lower melting point can be used in the process.

In accordance with the invention, a molten body of parent metal is disposed in intimate contact with the permeable mass or bed along a surface or zone thereof, which comprises filler and a carbon source. The bed may be oriented with respect to the parent metal in any manner as long as the direction/development of the metal infiltration and reaction product will be towards and will engulf at least a portion of the bed without substantially disturbing or displacing it. Where desired, one or more fillers which are substantially inert or non-reactive under the process conditions may be incorporated into the bed or preform. Suitable inert fillers may be chosen from the oxides, borides, nitrides and carbides of the metals aluminum, titanium, zirconium, hafnium, tantalum, cerium, scandium, thorium, uranium, and yttrium. These inert fillers can be useful in imparting desired end properties to the composite structure. Any of the filler materials used in the bed may comprise ceramic or metal fibers, whiskers, particulates, powders, rods, refractory cloth, reticulated ceramic foam, plates, platelets, solid spheres, and hollow spheres. Further, the bed or preform of filler materials may be homogeneous or heterogeneous.

A particularly effective method for practicing this invention involves forming the bed of carbon source and filler material(s), into a preform with a shape corresponding to the desired geometry of the final composite part. The preform may be prepared by any conventional ceramic body forming methods (such as uniaxial pressing, isostatic pressing, slip casting, sedimentation casting, tape casting, injection molding, filament winding for fibrous materials, etc.) depending on the characteristics of the carbon source and fillers. Initial binding of the particles or fibers prior to reactive infiltration may be obtained through light sintering or by use of various organic or inorganic binder materials which do not interfere with the process or contribute undesirable by-products to the finished material. The preform is manufactured to have sufficient shape integrity and green strength, and should be permeable to the transport of molten metal. The preferred porosity of the preform depends on various factors including the ratio of the carbon reactant to inert filler, the volume growth of said carbon when reacting to form a parent metal carbide and the amount of porosity (if any) required in the reaction product. Such porosity may optionally be filled by molten parent metal if present in excess of stoichiometric amount for carbide formation. Preferred preform porosity is between about 5 and 90% by volume, and more preferably between about 35 and 60% by volume. The preform is then contacted with molten parent metal on one or more of its surfaces for a time sufficient to complete the reactive infiltration of the parent metal to form a matrix extending through the preform to its surface boundaries and preferably to substantially fill the interstices of the preform with reaction product. The result is a composite body of a shape closely or exactly representing that desired in the final product, thus minimizing or eliminating expensive final machining or grinding operations.

The amount of carbon source(s) used in producing the product is less than or equal to that which is stoichiometrically required for its substantially complete reaction with the molten parent metal. Because the amount of parent metal relative to the required amount of carbon source can be varied, it is possible to control or to modify the properties of the completed composite body by varying the relative quantity of parent metal.

When the parent metal and the carbon source are in stoichiometric amounts, the composite body properties tend to be dominated by the parent metal carbide, such that the body or matrix would be less conductive or less ductile or less tough as compared to a composite containing free metal. When an excess of parent metal is used such that not all molten parent metal infiltrating the mass or bed is reacted, the matrix contains free metal or may be dominant in metal, and therefore the composite body or matrix properties are influenced or dominated by the properties of the parent metal, most typically ductility or toughness. Preferably, the quantity of parent metal in relation to the interstitial pore volume and content of carbon source is such that upon completion of the reaction, the pore volume is completely filled or nearly completely filled with reaction product carbide and/or unreacted metal. This is particularly desirable in producing a substantially pore-free (dense) body.

In practicing one embodiment of this invention, the parent metal precursor, e.g., titanium, is formed into an ingot, billet, rod, plate, or the like. The metal is at least partially embedded in a suitable carbon source, e.g. elemental carbon, and a filler, such as for example a Group IVB metal carbide. Optionally, the bed may include alternative filler materials, e.g., alumina, zirconia, etc. This setup or assembly may be surrounded by an inert material, typically in particulate form, which is non-wettable by and non-reactive with the molten metal under the process conditions, and contained within a crucible or other refractory vessel. The top surface of the parent metal may be exposed, or the parent metal may be completely embedded or surrounded by the bed of carbon source and filler, and also the surrounding inert bed may be omitted. This assembly is placed in a furnace and heated in an inert atmosphere such as argon, above the melting point of the parent metal but preferably below the melting point of the desired parent metal carbide so as to form a body or pool of molten metal. It should be understood that the operable temperature range or preferred temperature may not extend over this entire interval. The temperature range will depend largely upon such factors as the composition of the parent metal and the choice of carbon source and filler materials. Molten metal contacts the carbon source, and a parent metal carbide is formed as the reaction product. Upon continued exposure to the carbon source, the remaining molten metal is progressively drawn in the direction of and into the mass containing the carbon source, to provide continued formation of reaction product. The composite produced by this method comprises the reaction product of the parent metal with the carbon source and filler. If the parent metal is an alloy, the composite may include one or more alloying constituents of the parent metal in either reacted or unreacted form. Also, the composite may contain liberated metal resulting from the use of reducible metal carbides, a solid solution of Group IVB metal carbides, or an additional filler, as explained above.

The articles produced by the method of this invention are relatively dense, self-supporting bodies exhibiting a metal and/or ceramic microstructure. The properties of the product can be varied widely, depending on the end use, as by choice of Group IVB metal carbide fillers, choice of other inert fillers, and ratio of metal to carbon. For example, a product of Ti/TiC made by infiltrating a bed of carbon and titanium carbide with an excess of titanium, might be a useful wear part.

FIG. 1 shows one embodiment of the apparatus in which the invention may be practiced. The apparatus comprises a cylindrical graphite crucible 10 provided with a titanium carbide inner liner 11. The cavity within the liner is partially filled with a permeable filler bed 14 comprised of one or more relatively inert filler materials such as a Group IVB metal carbide and a carbon source. A solid body of carbide-forming parent metal 12 is embedded in the filler.

The graphite crucible and its contents are positioned within a furnace, such as, for example, within a graphite susceptor of an induction furnace (not shown). In such case, heat transfer from the susceptor to the crucible outer wall is predominantly by radiation. The major mode of heat transfer from the crucible wall to the contents thereof is by conduction.

An optical pyrometer (not shown) is positioned vertically above the apparatus and focused on the interior of the crucible to enable measurement and control of furnace temperature.

The above-described apparatus was used for the following examples.

Examples 1, 2 and 3 demonstrate the conversion of titanium metal to titanium carbide by reaction with carbon within a titanium carbide filler.

EXAMPLE 1

A rod of 99.7% purity titanium metal (from Alfa Product Division of Morton Thiokol) 12.7 mm diameter by 29.5 mm high constituting 0.354 mole of Ti comprised the parent metal body of FIG. 1. The filler bed consisted of 0.354 mole of carbon (in the form of minus 100 mesh graphite) and 0.023 mole of titanium carbide powder (also from the above-named supplier).

The crucible and its contents were heated by the following procedure:

Ramp to 1500° C. in 30 minutes under 5 liters per minute argon flow

Soak at 1500° C. for 10 minutes

Ramp to 1700° C. in 15 minutes.

When the indicated temperature reached 1590° C., a temperature rise occurred to a peak of 2200° C. followed by a drop-off to 1650° C.

Hold at 1700° C. for 5 minutes

Allow to cool.

It was found after cooling that a cavity had formed in the area originally occupied by the Ti rod.

The reaction product was removed from the crucible and the structure examined under an optical microscope. It was evident that titanium metal had penetrated into the filler and reacted completely therein to form new titanium carbide. The latter constituent was present as a matrix embedding the titanium carbide filler particles and yielding a cohesive composite.

EXAMPLE 2

A rod of 99.7% purity titanium 12.7 mm diameter by 29.0 mm high (0.348 mole) was embedded in a filler bed comprised of 0.24 mole of carbon in the form of acetylene black and 0.24 mole of titanium carbide filler.

The crucible and its contents were heated by the following procedure:

Ramp to 1550° C. in 40 minutes under 3 liters per minute argon flow

Soak at 1550° C. for 10 minutes

Ramp to 1700° C.

Cut off power supply

The temperature continued to rise to a maximum of 1890° C.

Allow to cool.

As in Example 1, a cavity was formed in the area originally occupied by the metal. From microstructural examination of the reaction product it was evident that titanium metal had penetrated into the filler and reacted completely therein to form new titanium carbide, yielding a cohesive composite of titanium and titanium carbide.

EXAMPLE 3

A rod of 99.7% purity titanium metal 12.7 mm diameter by 30.0 mm high (0.363 mole) was embedded in a filler bed comprised of 0.25 mole of minus 20 mesh particulate petroleum coke and 0.25 mole of titanium carbide powder.

Heating conditions were identical with those of Example 2. A similar cavity was observed after cooling the crucible and a similar product and product microstructure were obtained.

Example 4 demonstrates the conversion of zirconium metal to zirconium carbide by reaction with carbon within a titanium carbide filler and the formation of a titanium-zirconium carbide final product.

Two pieces of zirconium, nestled together and totalling 0.09 mole, were placed in the crucible of FIG. 1 and embedded in a bed comprising 0.09 mole of carbon (graphite particles, minus 100 mesh) and 0.09 mole of TiC powder. The crucible and its contents were heated to 2250° C. under a flowing atmosphere of argon, and held at that temperature for 3 minutes. Temperature was then increased to 2300° C. and power shut off.

After cooling to room temperature, the composite reaction product was removed and examined under the optical microscope and by X-ray diffraction. A constituent comprising a solid solution having the composition $(Zr_{0.9}Ti_{0.1})C$ was observed at the interface between residual unreacted metal and the carbon/titanium carbide bed as a penetrated layer 2–3 mm thick. The residual metal contained precipitated zirconium carbide.

What is claimed is:

1. A method for producing a self-supporting ceramic composite comprising a carbide, which method comprises:
   a) establishing in a substantially inert atmosphere a body of molten parent metal comprising a metal selected from the group consisting of titanium, hafnium and zirconium in surface contact with a permeable mass comprising (1) a filler comprising at least one relatively inert compound and a metal carbide comprising at least one carbide of a metal selected from the group consisting of titanium, hafnium and zirconium and (2) a carbon source for reaction with said molten metal to form a carbide of the molten metal, the carbon moiety of said carbon source being present in no more than a stoichiometric amount, said carbon source comprising elemental carbon and at least one reducible metal carbide selected from the group consisting of the carbides of molybdenum, chromium, cobalt, iron, nickel and vanadium;
   b) maintaining said surface contact for a time sufficient to effect infiltration of molten parent metal into said permeable mass and to permit reaction of said parent metal with said carbon source to form (1) a parent metal carbide comprising a carbide of a metal selected from the group consisting of titanium, hafnium and zirconium and (2) a metallic constituent comprising at least one metal reduced from said at least one reducible metal carbide; and
   c) continuing said infiltration and reaction for a time sufficient to at least substantially complete said reaction of said carbon source with said parent metal and thereby produce said self-supporting ceramic composite.

2. A method of claim 1, wherein said metal carbide comprises a carbide of the same metal as the parent metal.

3. The method of claim 1, wherein said metal carbide comprises a carbide of a metal different from said parent metal.

4. The method of claim 3, further comprising formation of a ternary solid solution of said parent metal, said different metal and carbon.

5. The method of claim 1, wherein said mass comprises less than the stoichiometric amount of said carbon source to react with said molten parent metal, wherein not all molten parent metal infiltrating said mass is reacted, thereby producing a self-supporting body also containing unreacted parent metal.

6. The method of claim 1, wherein said metal carbide filler further comprises at least one carbide of a metal selected from the group consisting of silicon, tantalum and tungsten.

7. A method for producing a self-supporting ceramic composite comprising Group IVB metal carbide material, which method comprises:
   (a) establishing in a substantially inert atmosphere a body of molten parent metal alloy comprising (1) a primary constituent selected from the group consisting of titanium, hafnium and zirconium and (2) at least one alloying constituent different in composition from the metal selected in (1) above, said parent metal alloy being in surface contact with a permeable mass comprising (i) a filler, and (ii) a carbon source for reaction with said molten parent metal to form the carbide thereof, the carbon moiety of said carbon source being present in no more than a stoichiometric amount;
   (b) maintaining said surface contact for a time sufficient to effect infiltration of molten parent metal into said permeable mass and to permit reaction of at least said primary constituent of said molten parent metal with said carbon source to form a parent metal carbide; and
   (c) continuing said infiltration and reaction for a time sufficient to at least substantially complete said reaction of said carbon source and to thereby produce said self-supporting ceramic composite.

8. The method of claim 7, wherein substantially no reaction of said carbon source with said at least one alloying constituent of said parent metal alloy occurs.

9. The method of claim 7, wherein at least a portion of said carbon source reacts with at least a portion of said at least one alloying constituent of said parent metal to form at least one carbide of said alloying constituent.

10. The method of claim 9, wherein said at least one alloying constituent comprises at least one metal selected from the group consisting of titanium, hafnium and zirconium.

11. The method of claim 10, wherein said at least one parent metal carbide and said carbide of said at least one alloying constituent form at least one solid solution.

12. The method of claim 7, wherein substantially all of said primary constituent reacts with said carbon source.

13. The method of claim 12, wherein at least a portion of said carbon source reacts with at least a portion of said at least one alloying constituent to form at least one carbide of said at least one alloying constituent.

14. The method of claim 13, wherein said at least one carbide of said at least one alloying constituent comprises at least one metal carbide selected from the group consisting of molybdenum carbide, chromium carbide, cobalt carbide, iron carbide, nickel carbide and vanadium carbide.

15. The method of claim 1, wherein said carbon source comprising elemental carbon ranges in size from about minus 325 Tyler mesh to about minus 20 Tyler mesh.

16. The method of claim 1, wherein said carbon source comprising elemental carbon comprises petroleum coke.

17. The method of claim 1, wherein said filler comprises at least one material selected from the group consisting of fibers, particulates, reticulated foam, plates, solid spheres and hollow spheres.

18. The method of claim 1, wherein said permeable mass comprises a preform.

19. The method of claim 1, wherein said filler comprises at least one material selected from the group consisting of whiskers, powders, rods, wire cloth, refractory cloth and platelets.

20. The method of claim 1, wherein said at least one relatively inert compound comprises at least one compound selected from the group consisting of the oxides, borides, nitrides and carbides of at least one metal selected from the group consisting of aluminum, titanium, zirconium, hafnium, tantalum, cerium, scandium, thorium, uranium and yttrium.

* * * * *